US012625056B2

(12) United States Patent　　　　(10) Patent No.: US 12,625,056 B2
Shinozaki et al.　　　　　　　　　　(45) Date of Patent: May 12, 2026

(54) PARTICLE COUNTER

(71) Applicant: RION CO., LTD., Kokubunji (JP)

(72) Inventors: Daisuke Shinozaki, Kokubunji (JP); Daisuke Sakaue, Kokubunji (JP); Moe Susaki, Kokubunji (JP); Tomonobu Matsuda, Kokubunji (JP)

(73) Assignee: RION CO., LTD., Tokyo (JP)

( * ) Notice: Subject to any disclaimer, the term of this patent is extended or adjusted under 35 U.S.C. 154(b) by 351 days.

(21) Appl. No.: 18/087,968

(22) Filed: Dec. 23, 2022

(65) Prior Publication Data

US 2023/0204488 A1　　Jun. 29, 2023

(30) Foreign Application Priority Data

Dec. 27, 2021　(JP) ................................. 2021-211860

(51) Int. Cl.
　*G01N 15/1434*　　(2024.01)
　*G01N 15/14*　　　(2024.01)

(52) U.S. Cl.
　CPC . *G01N 15/1434* (2013.01); *G01N 2015/1452* (2013.01); *G01N 2015/1486* (2013.01)

(58) Field of Classification Search
　CPC ........... G01N 15/1434; G01N 15/1459; G01N 15/1436; G01N 15/1425; G01N 2015/1452; G01N 2015/1486
　See application file for complete search history.

(56) References Cited

U.S. PATENT DOCUMENTS 6,246,505 B1　6/2001　Teowee et al.
7,315,372 B1 *　1/2008　Billard ............... G01N 15/1434
　　　　　　　　　　　　　　　356/338

9,645,291 B1 *　5/2017　Sommer ............ G01N 21/6458
2009/0108214 A1 *　4/2009　Shinoda ............ G01N 15/1425
　　　　　　　　　　　　　　　250/492.1
2014/0315288 A1 *　10/2014　Miyamura ......... G01N 33/5094
　　　　　　　　　　　　　　　29/428
2017/0198782 A1 *　7/2017　Rowlen .............. G01N 15/1436
2017/0261419 A1 *　9/2017　Glensbjerg ......... G01N 15/1436
2019/0004299 A1 *　1/2019　Kukura .............. G02B 21/0004

(Continued)

FOREIGN PATENT DOCUMENTS

JP　　H07-294410 A　　11/1995
JP　　2009-058306 A　　3/2019

(Continued)

OTHER PUBLICATIONS

Japanese Patent Office, Office Action, Application No. 2021-211860, dated Sep. 30, 2025, in 8 pages.

*Primary Examiner* — Tarifur R Chowdhury

*Assistant Examiner* — Paul Schnase

(74) *Attorney, Agent, or Firm* — PROCOPIO, CORY, HARGREAVES & SAVITCH LLP

(57)　　　ABSTRACT

A particle counter is configured to count particles contained in a sample fluid flowing through a flow passage by using light with which the flow passage is irradiated. The particle counter includes: a multi-flow cell having a plurality of the flow passages; a path adjuster configured to adjust a position of an optical path of the light with respect to the multi-flow cell, based on which flow passage is selected from the flow passages; and a light adjuster configured to adjust a condition of the light with which the selected flow passage is irradiated.

17 Claims, 10 Drawing Sheets

(56) References Cited

U.S. PATENT DOCUMENTS

| | | | |
|---|---|---|---|
| 2020/0240890 A1 | 7/2020 | Matsuda et al. | |
| 2020/0240893 A1* | 7/2020 | Matsuda | G01N 15/1404 |
| 2021/0381948 A1* | 12/2021 | Rodier | G01N 15/0205 |

FOREIGN PATENT DOCUMENTS

| | | |
|---|---|---|
| JP | 2020-118549 A | 8/2020 |
| WO | 2021-252481 A1 | 12/2021 |

* cited by examiner

PARTICLE COUNTER

CROSS-REFERENCE TO RELATED APPLICATION

This application is based on and claims priority under 35 USC § 119 from Japanese Patent Application No. 2021-211860, filed on Dec. 27, 2021, the entire contents of which are incorporated herein by reference.

TECHNICAL FIELD

The present disclosure relates to a particle counter configured to count the number of particles contained in a sample fluid.

BACKGROUND

JP2020-118549A, for example, discloses a particle counter having a multi-flow cell. This particle counter is characterized in that an optical system forming an optical path through which light emitted from a common light source travels to each flow cell (in a flow passage) is movable with respect to the fixed multi-flow cell. As a result, an excessive load is not applied to a pipe connected to each flow cell, and a sample fluid can be reliably prevented from leaking due to looseness or cracking of the pipe.

In addition, there is a demand for further convenience for this particle counter. For example, although a common light source is used for the optical system, it is desirable that each sample fluid (in a case of a multi-flow cell, each flow cell for which a position of an optical path is to be adjusted) be usable under an appropriate condition of the light since the appropriate condition differs depending on types of sample fluids (chemical solution) and particles flowing through the flow cell. This is based on a concern that, if light having a common condition is used for all the sample fluids and particles, power of the light may be too strong or too weak for a specific sample fluid or particles (flowing through a selected flow cell in the multi-flow cell) to be counted, which may cause a problem in a counting result of the particles.

Therefore, the present disclosure provides a particle counter with improved convenience.

SUMMARY

In order to solve the above-mentioned problem, the present disclosure employs the following solutions. Note that elements in parentheses below is merely examples, and the present disclosure is not limited thereto.
First Aspect The present disclosure provides a particle counter. The particle counter is configured to count particles contained in a sample fluid flowing through a flow passage by using light with which the inside of the flow passage is irradiated. The particle counter includes a flow cell having the flow passage, and the sample fluid (chemical solution) is caused to flow through the flow passage from a connection pipe or the like. The particles are counted by size based on the intensity of light from a particle passing through a detection region in the flow passage by aligning the position of an optical path (optical axis) of the light to the flow passage. The particle counter further includes a light adjuster configured to, for example, adjust a condition (such as power, wavelength, density distribution, and polarization) of the light.

The particle counter can count the particles with the condition of the light appropriately adjusted according to characteristics of the sample fluid and the particles flowing through the flow passage, enabling highly reliable particle counting.
Second Aspect The present disclosure also provides another particle counter. The particle counter is configured to count particles contained in a sample fluid flowing through a flow passage by using light with which the inside of the flow passage is irradiated. The particle counter includes a multi-flow cell. For example, the multi-flow cell has a plurality of flow passages, and a sample fluid (chemical solution) is caused to flow through a flow passage from a connection pipe or the like. The particles are counted by size based on the intensity of light from a particle passing through a detection region in the flow passage by adjusting the position of the optical path (optical axis) of the light to a flow passage selected as a counting target.

The particle counter includes a path adjuster configured to adjust the position of the optical path of the light with respect to the multi-flow cell according to which flow passage is selected from the flow passages. The particle counter further includes a light adjuster configured to, for example, adjust a condition (such as power, wavelength, density distribution, and polarization) of the light with the position of the optical path adjusted by the path adjuster.

The particle counter can count the particles with the condition of the light appropriately adjusted according to characteristics of the sample fluid and the particles flowing through the flow passage selected as the counting target, enabling highly reliable particle counting.

The light adjuster includes optical equipment. The optical equipment includes, for example, an optical filter, a beam splitter, and/or the like. By arranging the optical equipment on the optical path, the intensity of the light emitted from a light source can be adjusted as desired. Accordingly, even if the particle counter uses a single light source, the intensity of the light can be adjusted according to characteristics of the sample fluid and the particles flowing through a flow passage by using the optical equipment. The optical filter may be, for example, an ND filter or a polarization filter.

If characteristics of the sample fluid and the particles flowing through the flow passage are known, optical equipment capable of optimally adjusting the intensity of the light according to the flow passage can be prepared for each of the flow passages. It is preferable that the optical equipment be arrangeable on the optical path whose position is adjusted by the path adjuster. As the optical equipment, only an optical filter or a beam splitter may be used, and both may be used. If an optical filter and/or a beam splitter is an individualized product, a single product or some products combined may be used.

Only by adjusting the position of the optical path according to the flow passage selected as the counting target, the particle counter can adjust the intensity of the light by using the optical equipment in tandem with the position adjustment of the optical path, enhancing convenience of the particle counter.

The optical equipment may be arranged on the optical path corresponding to only some of or all of the flow passages. If the optical equipment is arranged on the optical path corresponding to only some of the flow passages, a light-transmitting member (for example, a glass plate) can be arranged on the optical path corresponding to the other flow passages. The light-transmitting member can align the light with a change in the optical axis due to passage of the light through the optical equipment. As a result, it is possible to match a condition of the optical axis corresponding to the flow passage for which the optical equipment is arranged and that of the optical axis corresponding to the flow passage for which the optical equipment is not arranged.

In a particle counter according to the present disclosure, a light adjuster may be configured to move the optical equipment to an in position, where the light passes through the optical equipment, and an out position, where the light does not pass through the optical equipment. If a plurality of pieces of optical equipment having different characteristics are used to adjust the intensity of the light, the light adjuster may selectively arrange, on the optical path, a piece of the optical equipment having characteristics suitable for the flow passage selected as a counting target. The adjustment by the light adjuster may be automatically controlled.

Therefore, according to characteristics of the flow passage (sample fluid or particles flowing through the flow passage) selected as the counting target, it becomes possible to adjust or not to adjust the intensity by the optical equipment and to adjust the intensity independently for each of the flow passages, enhancing the convenience.

As described above, according to the present disclosure, it becomes possible to provide a particle counter with improved convenience.

BRIEF DESCRIPTION OF DRAWINGS

Exemplary embodiments of the present disclosure will be described in detail based on the following figures, wherein.

DESCRIPTION OF EMBODIMENTS

Figure 1:
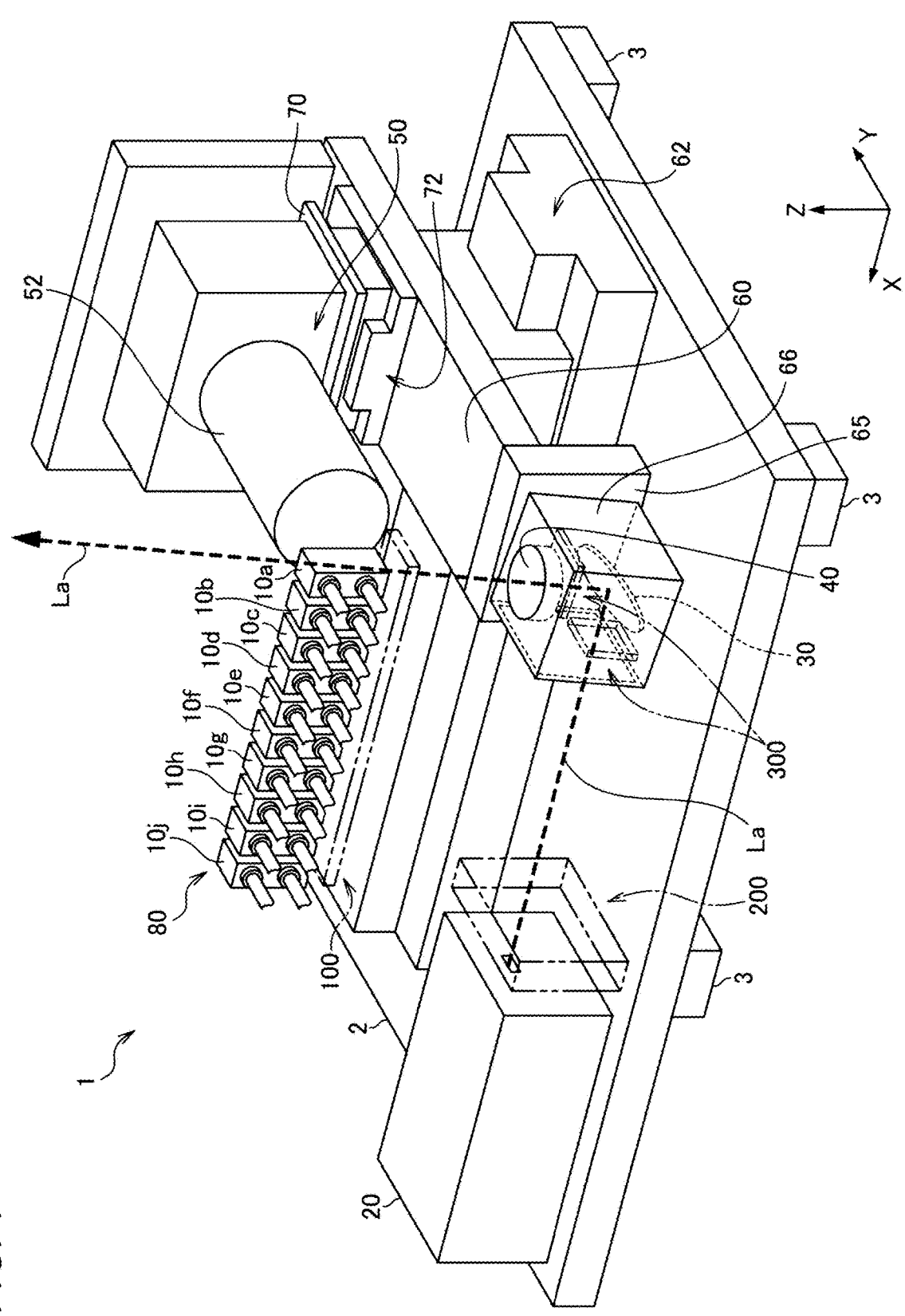
FIG. 1 is a perspective view schematically illustrating a particle counter 1 according to an embodiment.

Hereinafter, some embodiments of the present disclosure will be described with reference to the drawings. The following embodiments are merely examples, and the present disclosure is not limited thereto.
Configuration of Particle Counter FIG. 1 is a perspective view schematically illustrating a particle counter 1 according to an embodiment. In FIG. 1, illustrations of some components may be omitted. The particle counter 1 is an aspect of a particle counter, and whether the particle counter 1 is a counter or a counting device is merely a difference in terms of name, and there is no technical difference.

Components included in the particle counter 1, such as a light source 20, a mirror 30, a lighting lens 40, a multi-flow cell (flow cell unit) 80, and a light receiver 50, are directly or indirectly supported by jigs or the like with respect to a sensor base 2. A plurality of legs 3 is provided on a bottom surface of the sensor base 2. The legs 3 are formed of an elastic member, such as vibration-damping rubber capable of absorbing vibration. The particle counter 1 is housed in a housing.

According to the present embodiment, the particle counter 1 includes the multi-flow cell 80 as an example of a flow cell. The multi-flow cell 80 includes, for example, ten flow cells 10a to 10j arrayed in a width direction. Each of the flow cells 10a to 10j is formed of a transparent material such as quartz and sapphire, and has a substantially C-shaped flow passage therein. The flow passage is opened at two positions of upper and lower on a front surface side of each of the flow cells 10a to 10j. Pipes through which a sample fluid flows are connected to these openings. The number of flow cells included in the multi-flow cell 80 is not limited to a specific example.

If a longitudinal direction of the sensor base 2 is defined as the width direction of a counter main body and a direction orthogonal thereto is defined as a front-rear (depth) direction, the multi-flow cell 80 is arrayed in the width direction. Although not illustrated in FIG. 1, each of the flow cells 10a to 10j is fixed inside a flow cell holder. In the following, a direction in which the plurality of flow cells 10a to 10j are arrayed is referred to as an X-direction, and an axis extending in the X-direction is referred to as an X-axis.

The light source 20 is fixed to the sensor base 2, and emits light La (for example, laser light) at a predetermined intensity and wavelength. The light La is emitted in the X-direction directively such that the opening angle of the light La can be considered substantially zero. The sensor base 2 also serves as a heat sink of the light source 20. The mirror 30 reflects the light La emitted from the light source 20 toward a detection region in the flow cells 10a to 10j. The lighting lens 40 is provided on an optical path of the reflected light La. The light La passes through the lighting lens 40.

The light receiver 50 is provided behind the multi-flow cell 80. The light receiver 50 includes a plurality of light-receiving lenses, a light-receiving element, an amplifier, an A-to-D converter, and the like. The plurality of light-receiving lenses is housed in a cylindrical light-receiving tube 52 for reducing reception of light of background noise. In the flow cells 10a to 10j that the light La enters, when a particle contained in the sample fluid passes through the detection region, scattered light is generated from the particle. The scattered light is condensed by the light-receiving lens, collected in the light-receiving element (for example, a photodiode), and converted into electrical signals. As a result, the particle can be counted for each particle size based on an intensity of the scattered light. In a case where the particle contains a fluorescent substance, the particle can be counted in a similar manner as in the case of the scattered light by receiving fluorescence emitted from the particle.

In the following, the axis of the light-receiving lens (hereinafter, referred to as a "light-receiving axis") is referred to as a Y-axis, and a direction in which the Y-axis extends (a front-rear direction of the body of the counter) is referred to as a Y-direction. In a case where the vertical direction is defined as a Z-direction, the X-direction, the Y-direction, and the Z-direction are perpendicular to one another.

Movement (Position Adjustment) of Optical System

In the particle counter 1, the optical path (optical axis) of the light La emitted from the common light source 20 is movable to a position corresponding to each of the flow cells 10a to 10j. In other words, the light source 20 and the multi-flow cell 80 are fixed to the sensor base 2, while the optical path of the light La reflected by the mirror 30 is movable in an arrangement direction of the flow cells 10a to 10j.

Such movement of the optical system is implemented by using, for example, an X-axis actuator 62. When the X-axis actuator 62 moves a slider, an X-axis stage 60 moves the mirror 30 and the lighting lens 40 in the X-direction together with a vertical bracket 65 and a holder 66. As a result, the position of the optical path of the light La can be adjusted in accordance with each of the flow cells 10a to 10j.

For example, in FIG. 1, the position of the optical path is aligned with the flow cell 10a located at one end of the multi-flow cell 80. If the X-axis actuator 62 is driven as described above, the position of the optical path of the light La can be adjusted so as to be aligned with another one of the flow cells 10b to 10j.

A position of a light-receiving optical system including the light receiver 50 can be adjusted in the Y-direction. A Y-axis actuator 72 is provided on the X-axis stage 60. Components of the light-receiving optical system including the light receiver 50 are supported on the slider by the intermediacy of a Y-axis stage 70.

Adjustment of Light Condition

According to the present embodiment, the particle counter 1 including the multi-flow cell 80 has a plurality of channels for counting particles. That is, the particle counter 1 can perform particle counting using the plurality of channels by causing different types of sample fluids to flow through the ten flow cells 10a to 10j. In this case, the position of the optical path of the light La can be adjusted in accordance with each of the flow cells 10a to 10j. The light source 20 is a single (common) light source, and with such light source 20, the condition (intensity) of the light La is uniform for all the sample fluids. Therefore, the particle counter 1 needs to adjust the condition of the light La for each channel in accordance with the characteristics of the sample fluid and the particles flowing through each of the flow cells 10a to 10j.

For this reason, according to the present embodiment, a plurality of units 100, 200, and 300 can be used for condition adjustment of the light La. A downstream power adjustment unit 100, an upstream power adjustment unit 200, and a midstream power adjustment unit 300 are one preferable example. The downstream power adjustment unit 100 is arranged on the optical path of the light La between the lighting lens 40 and the multi-flow cell 80 in the optical system. The upstream power adjustment unit 200 is arranged on the optical path from the light source 20 to the mirror 30. The midstream power adjustment unit 300 is arranged on the optical path in the holder 66. In the holder 66, the midstream power adjustment unit 300 can be divided into two part: one is arranged on an incident side of the mirror 30, and the other is arranged on an emission side (between the mirror 30 and the lighting lens 40). These units 100, 200, and 300 will be further described later with reference to other drawings.

Optical Equipment (Optical Element)

According to the present embodiment, the particle counter 1 uses, for example, an optical filter, a beam splitter, or the like to adjust the condition of the light La, in particular, the intensity (power, density distribution) thereof. As the optical filter, a neutral density (ND) filter, a polarization filter, and other types of optical filters can be used. Hereinafter, the optical filter and the beam splitter used in the present embodiment are referred to as "optical equipment," but the name is merely an example. The optical filter and the beam splitter may be referred to as "optical elements" or "optical filters."

Variability of Optical Characteristics

Further, according to the present embodiment, a substance capable of changing optical characteristics can be used for the optical equipment. Examples of an effect of changing the optical characteristics include the electro-optic effect (a generic term referring to some effects). Due to the electro-optic effect, the particle counter 1 can variably control characteristics, such as refractive index, absorbance (or transmittance), focal length, and polarizability, of the optical equipment, such as the optical filter and the beam splitter.

Examples of a substance that brings about the electro-optic effect include liquid crystals and crystals (electro-optic crystals). Since electro-optic crystals are any crystals having the electro-optic effect, there are various types of electro-optic crystals. Therefore, an appropriate crystal can also be used in the present embodiment.

As described above, according to the present embodiment, the optical equipment of the particle counter 1 can include a substance having the electro-optic effect, and characteristics of the substance can be changed by electrical signals from outside (electrical influence from outside). As a result, the characteristics of the optical equipment can be variably controlled without physically substituting the optical equipment with another object or changing the position of the optical equipment.

Downstream Power Adjustment Unit

Figure 2:
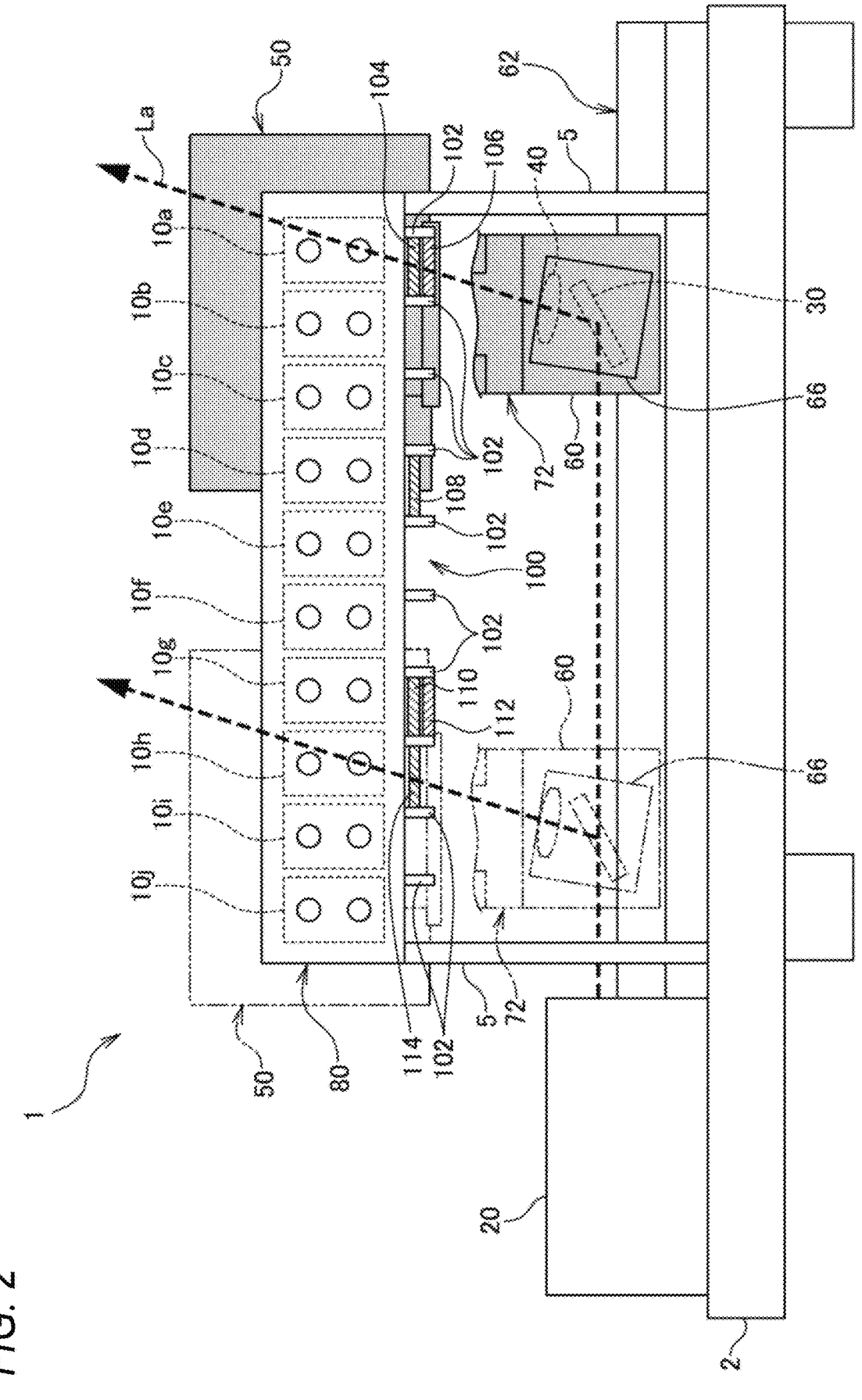
FIG. 2 is a diagram illustrating a configuration example 1 of a downstream power adjustment unit 100.
Figure 3:
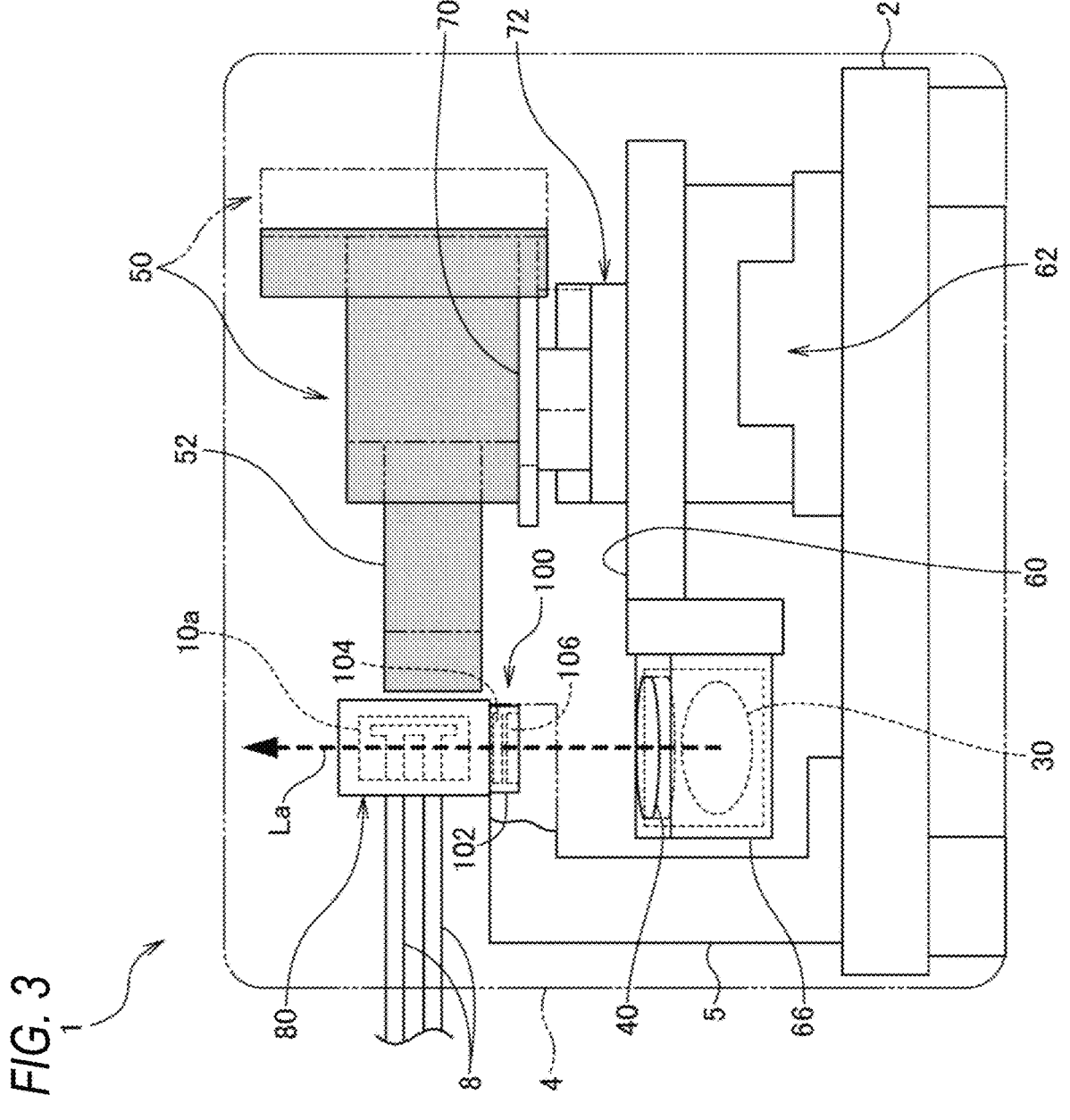
FIG. 3 is a diagram illustrating the configuration example 1 of the downstream power adjustment unit 100.

FIGS. 2 and 3 are diagrams illustrating a configuration example 1 of the downstream power adjustment unit 100. FIG. 2 is a front view of the particle counter 1 of FIG. 1. FIG. 3 is a side view of the particle counter 1. In FIG. 2, the opening on the front side of each of the flow cells 10a to 10j is illustrated in a circular shape.

The downstream power adjustment unit 100 is configured by arranging, for example, optical equipment 104, 106, 110, 112, and 114 and the like on a lower side of the multi-flow cell 80. As the optical equipment 104 and the like, for example, tabular optical equipment can be used, and the optical equipment 104 and the like are arranged so as to be positioned on the optical path of the light La. In order to hold the optical equipment 104 and the like, a plurality of brackets 102 is formed on a lower surface of the multi-flow cell 80 so as to protrude downward. The brackets 102 are arranged in the X-direction at regular intervals similarly to the flow cells 10a to 10j. The optical equipment 104 and the like are inserted between adjacent brackets 102.

For example, a flow cell base 5 is used to fix the multi-flow cell 80 with respect to the sensor base 2. The flow cell base 5 includes a C-shaped tabular member that is vertically erected on an upper surface of the sensor base 2. In addition, the flow cell base 5 is arranged in pair at both ends of the multi-flow cell 80. Therefore, the multi-flow cell 80 is fixed to the sensor base 2 with the lower side of the multi-flow cell 80 not touching the sensor base 2.

As for the arrangement, for example, two pieces of the optical equipment 104 and 106 are arranged on an optical path of the light La corresponding to the flow cell 10a located at the right end in FIG. 2. In addition, for example, one piece of optical equipment 108 is arranged on an optical path corresponding to a fourth flow cell 10*d* from the right. In addition, for example, two pieces of the optical equipment 110 and 112 are arranged on an optical path corresponding to a seventh flow cell 10*g* from the right. Further, for example, one piece of optical equipment 114 is arranged on an optical path corresponding to an eighth flow cell 10*h* from the right.

In FIG. 2, the optical path (optical axis) of the light La is aligned with the flow cell 10*a* at the right end as indicated by solid lines. For example, if the holder 66 is moved in the X-direction together with the X-axis stage 60 by driving the X-axis actuator 62, the optical path can be adjusted to a position corresponding to another flow cell 10*h* as indicated by dash-dot-dotted lines in FIG. 2. In addition, positions of the optical paths of the other flow cells 10*b* to 10*j* can be adjusted independently. Therefore, positions of the optical equipment 104 and the like are adjusted independently with respect to the respective flow cells 10*a* to 10*j*, and the optical equipment 104 and the like are arranged so as to be positioned on the respective optical paths of the light La.

Some of the optical equipment 104, 106, 110, 112, and 114 and the like may be different in types and/or optical characteristics. In addition, an example in which two pieces of the optical equipment 104 and the like are arranged to overlap each other is described here, but three or more pieces of the optical equipment 104 and the like may be arranged on one optical path. Although the flow cells 10*b*, 10*c*, 10*e*, 10*f*, 10*i*, and 10*j* are not provided with the optical equipment 104 and the like, these flow cells may be provided with the optical equipment 104 and the like as appropriate.

In any case, the downstream power adjustment unit 100 can adjust the intensity of the light La in accordance with the characteristics of the sample fluid and the particles flowing through each of the flow cells 10*a* to 10*j* by arranging the optical equipment 104 and the like on the optical path. If the optical equipment 104 and the like are arranged in the downstream power adjustment unit 100, the light La passes through the optical equipment 104 and the like, so that the light La is adjusted to an appropriate intensity. In addition, if the optical equipment 104 and the like are not arranged in the downstream power adjustment unit 100, the inside of the flow passage of each of the flow cells 10*a* to 10*j* can be irradiated with the light La whose intensity is adjusted to the intensity when the light La is emitted from the light source 20.

Figure 4:
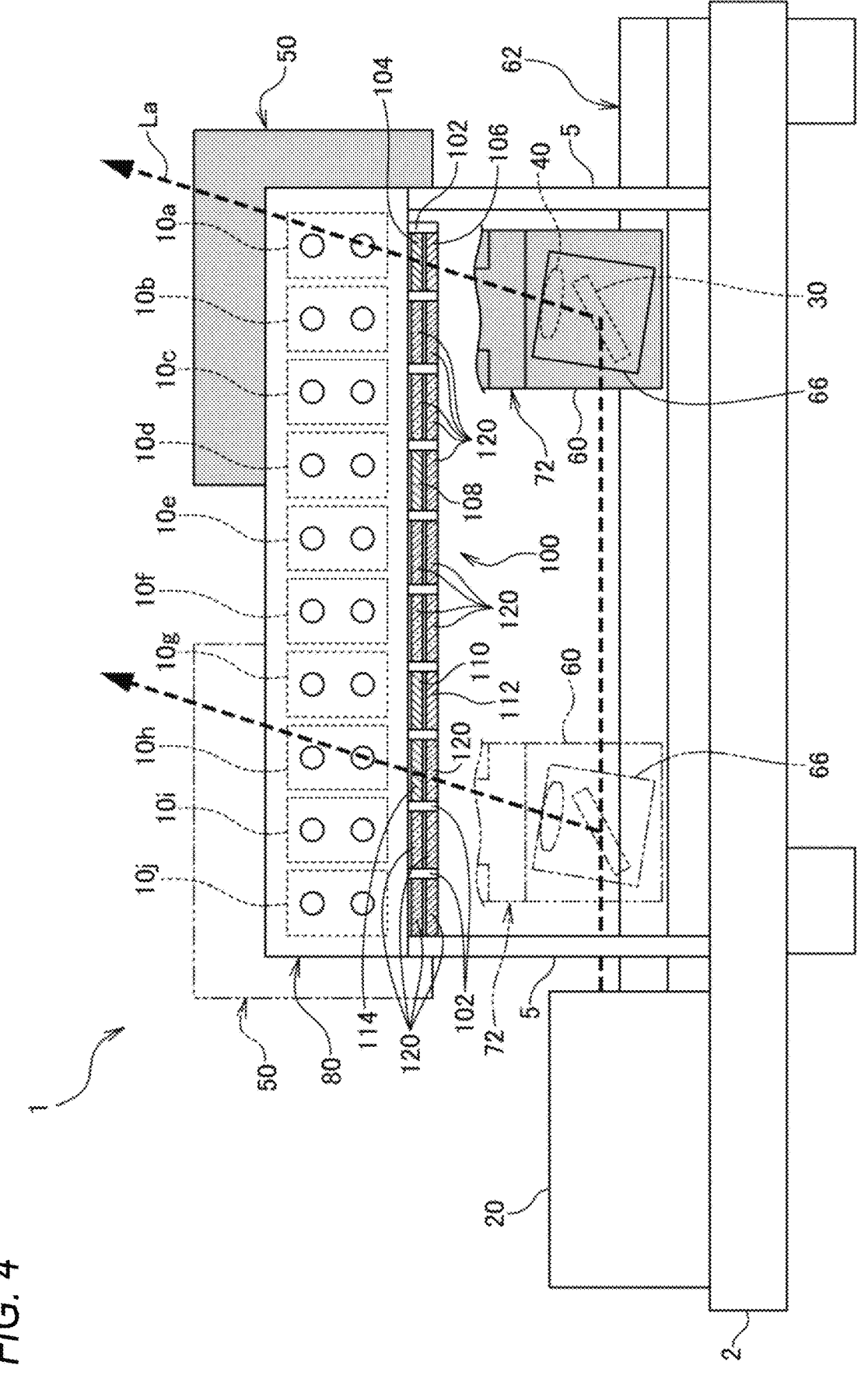
FIG. 4 is a diagram illustrating a configuration example 2 of the downstream power adjustment unit 100.

FIG. 4 is a diagram illustrating a configuration example 2 of the downstream power adjustment unit 100. In the above-mentioned configuration example 1, part where the optical equipment 104 and the like are not arranged is simply a space (air). On the other hand, in the configuration example 2, the light transmitting member 120 is arranged at positions where the optical equipment 104 or the like is not arranged. In the flow cell 10*d*, a light transmitting member 120 is arranged in addition to one piece of optical equipment 108. Also, in the flow cell 10*h*, a light-transmitting member 120 is arranged in addition to one piece of optical equipment 114.

In the configuration example 1, the medium through which the light La passes in the downstream power adjustment unit 100 depends on whether each of the flow cells 10*a* to 10*j* are provided with the optical equipment 104 and the like or not. On the other hand, in the configuration example 2, for all the flow cells 10*a* to 10*j*, the light La passes through any medium (for example, two media) of the optical equipment 104 and the like or the light-transmitting member 120.

The light-transmitting member 120 is, for example, a transparent glass plate, a transparent acrylic resin plate, or the like, and does not have substantial intensity adjustability for the light La. However, by the light La passing through the light-transmitting member 120, the light La can be aligned with a change in the optical axis due to the passage of the light La through the optical equipment 104 and the like. Therefore, in the configuration example 2, changes of optical axis can be made uniform for all the flow cells 10*a* to 10*j* regardless of presence or absence of the optical equipment 104 and the like, enabling easy adjustment of the position of the optical path using the X-axis actuator 62. In this regard, in the configuration example 1, in which there is no change in the optical axis of the light La in positions where the optical equipment 104 and the like are not arranged, the particle counter 1 needs to perform the position adjustment of the optical path using the X-axis actuator 62.

According to the downstream power adjustment unit 100, the following effects can be obtained.

(1) If, for example, an ND filter is used as the optical equipment 104 and the like for adjusting the intensity, the intensity of the light La with which the inside of the flow passage is irradiated is reduced as compared with a case without the ND filter. Accordingly, the intensity of the light La with which the sample fluid flowing through the flow cells 10*a*, 10*d*, 10*g*, and 10*h* is irradiated can be reduced. Therefore, the sample fluid and the particles flowing through the flow passage can be irradiated with appropriate intensity, and the particle counter 1 can count particles with high accuracy.

(2) Optical characteristics (for example, attenuation) of the ND filter can be selected appropriately for particle counting depending on the intensity of the light La emitted from the light source 20, the types of the sample fluid and the particles, and the like. For example, under the condition that the intensity of the light La emitted from the light source 20 is constant, an ND filter a is applied as the optical equipment 104 and the like if a sample fluid A flows through a certain channel, and an ND filter 13 is applied as the optical equipment 104 and the like if a sample fluid B flows through a certain channel. In this way, it is possible to adjust the intensity corresponding to the types and characteristics of the particles and the sample fluid to be counted.

(3) By arranging the optical equipment 104 and the like on the optical path in advance, the particle counter 1 does not need to perform any particular operation even when the particle counter 1 switches the channels (flow cells 10*a* to 10*j*) to be counted. The intensity of the light La can be adjusted to an intensity suitable for the characteristics of the sample fluid and the particles flowing through the target channel without extra operation.

(4) In the particle counter 1, the optical equipment 104 and the like to be used are not limited to the ND filter, and may be optical filters such as a polarization filter and a bandpass filter as long as the optical equipment 104 and the like are optical elements that are arranged on the optical path of the light La to act on the light La. In addition, a beam splitter such as a nonpolar beam splitter and a polarization beam splitter may be used, and optical filters or beam splitters having different performance or types may be combined.

(5) In addition, even when the types of the sample fluid and the particles flowing through each of the flow cells 10*a* to 10*j* are changed, the particle counter 1 can rapidly and easily adjust the intensity by replacing, adding, or removing the optical equipment 104 and the like as appropriate.

Other Configuration Examples

The downstream power adjustment unit 100 may have the following configurations.

The number of pieces of the optical equipment 104 and the like to be arranged on the optical path corresponding to each of the flow cells 10a to 10j can be chosen arbitrarily and may be one or more.

If a plurality of pieces of the optical equipment 104 and the like is arranged to form a filter set, in the filter set, filters arranged in an overlapping manner may have the same or different functionality and performance. The optical equipment 104 and the like may have different thicknesses along the optical path.

The optical equipment 104 and the like may be configured such that different filters (filter set) are arranged for each optical path to each of the flow cells 10a to 10j.

The optical equipment 104 and the like may be configured such that, by easy attachment/detachment of the optical equipment 104 and the like to the brackets 102 as in the configuration example 1, presence or absence of the optical equipment 104 and the like for each optical path to each of the flow cells 10a to 10j can be switched.

In addition, the optical equipment 104 and the like may have a flexible configuration. For example, in each of the flow cells 10a to 10j, the ND filter a may be applied as the optical equipment 104 and the like if the sample fluid A flows therethrough, and the optical filter a may be removed and replaced with another optical filter 13 if the sample fluid B flows therethrough.

The switching of the presence or absence of the optical equipment 104 and the like for the optical path to each of the flow cells 10a to 10j may be manually performed by an operator or may be automatically performed by a driving mechanism or the like.

Figure 5A:
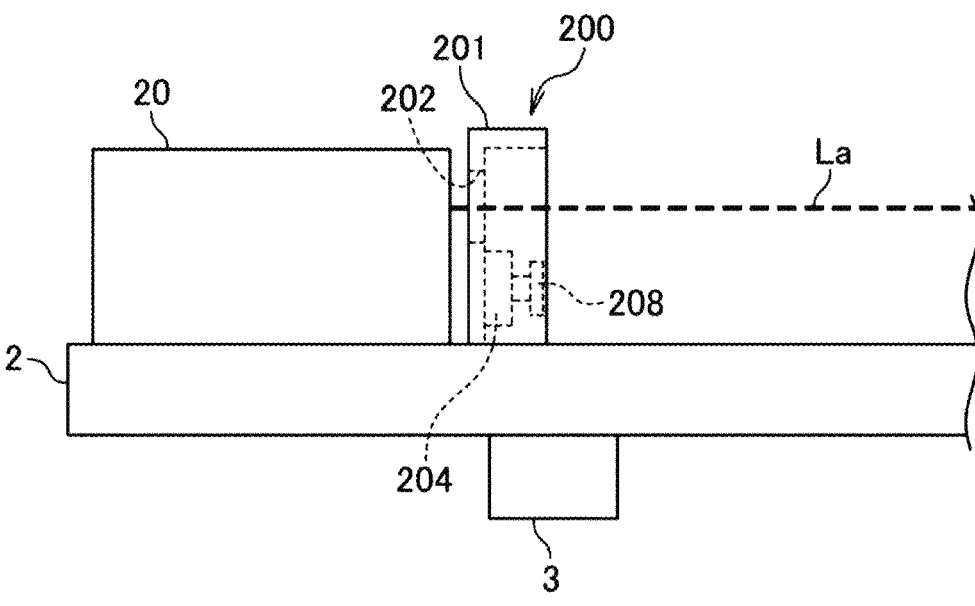
FIG. 5A is a diagram illustrating a configuration example 1 of an upstream power adjustment unit 200.
Figure 5B:
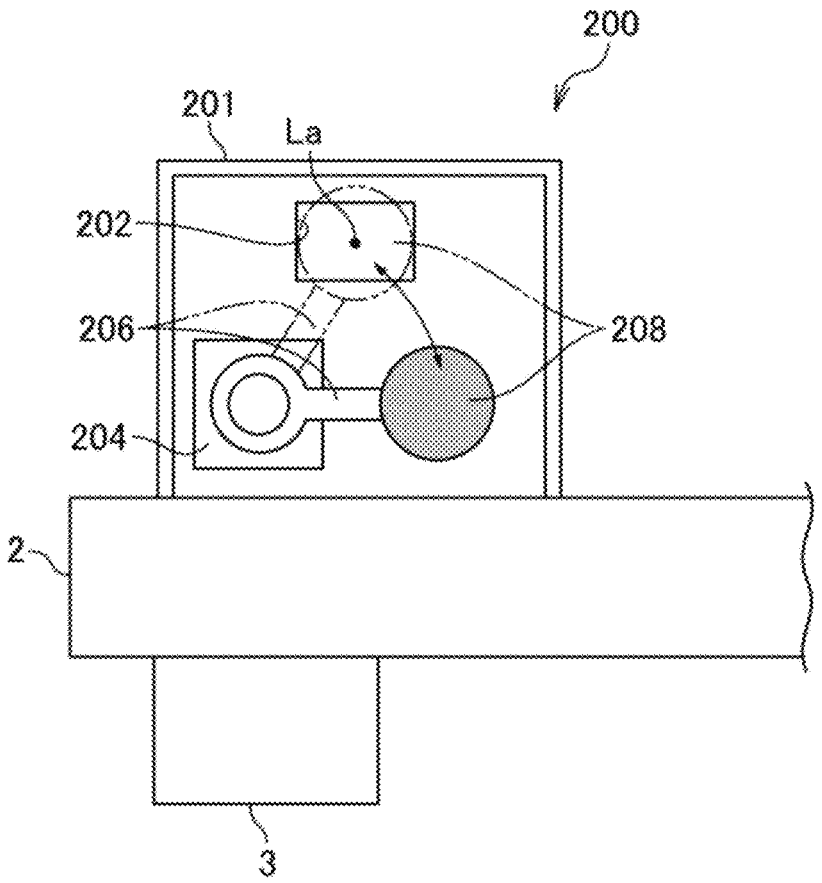
FIG. 5B is a diagram illustrating the configuration example 1 of the upstream power adjustment unit 200.

If the presence or absence of the optical equipment 104 and the like is automatically switched, appropriate optical equipment 104 and the like can be selected and arranged according to, for example, a sample fluid preset in the particle counter 1 or other conditions. Alternatively, the sample fluid flowing through the flow cells 10a to 10j of the channel selected as the counting target and other conditions may be detected, and appropriate optical equipment 104 and the like may be automatically selected and arranged based on detection results thereof Upstream Power Adjustment Unit Next, the upstream power adjustment unit 200 will be described. FIGS. 5A and 5B are diagrams illustrating a configuration example 1 of the upstream power adjustment unit 200. FIG. 5A is a partial front view of the upstream power adjustment unit 200 including the light source 20. FIG. 5B is a partial side view of the upstream power adjustment unit 200 including the light source 20.

As for FIG. 5A, the upstream power adjustment unit 200 is configured, for example, by arranging optical equipment 208 on an optical path of the light La immediately before and downstream from the light source 20. The upstream power adjustment unit 200 is provided at a position where the upstream power adjustment unit 200 does not interfere with the flow cell base 5, the range of motion of the holder 66 (irradiation optical system) by the X-axis actuator 62, and the like. The optical equipment 208 also may be an optical filter, a beam splitter, or the like. The upstream power adjustment unit 200 has a box-shaped housing 201 erected on the sensor base 2. A window 202 through which the light La passes is formed in the housing 201 in an opening manner. In addition, a rotary actuator 204 is provided inside the housing 201 together with the optical equipment 208. An output shaft of the rotary actuator 204 is rotatable around the X-axis shown in FIG. 1.

As for FIG. 5B, the optical equipment 208 is supported by the output shaft of the rotary actuator 204 by the intermediacy of a bracket 206. Although the number of pieces of the optical equipment 208 according to the configuration example 1 may be one, the optical equipment 208 can be displaced, by driving the rotary actuator 204, between a position (in position) through which the light La passes on the optical path indicated by the dash-dot-dotted lines and a position (out position) deviated from the optical path indicated.

Therefore, according to the configuration example 1 of the upstream power adjustment unit 200, if the optical equipment 208 is displaced to the out position, the intensity of the light La is adjusted to the intensity with which it is emitted from the light source 20. On the other hand, if the optical equipment 208 is displaced to the in position, the intensity of the light La is affected by the passage of the light La through the optical equipment 208.

Figure 6:
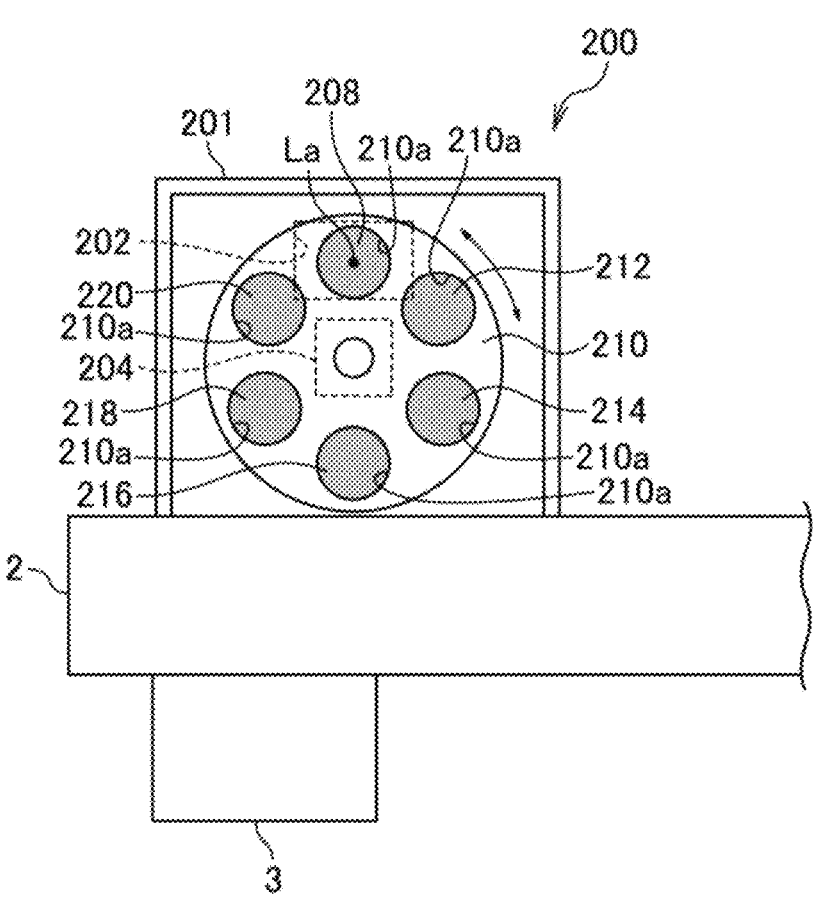
FIG. 6 is a diagram illustrating a configuration example 2 of the upstream power adjustment unit 200.

Next, FIG. 6 is a diagram illustrating a configuration example 2 of the upstream power adjustment unit 200. FIG. 6 illustrates a partial side view of the upstream power adjustment unit 200 including the light source 20.

Also, in the configuration example 2, the upstream power adjustment unit 200 has the housing 201 similar to that in the configuration example 1, and the window 202 is formed in the housing 201. A rotary disk 210 is attached to the output shaft of the rotary actuator 204 in the configuration example 2. In the rotary disk 210, a plurality of holes 210a is formed at regular intervals in a circumferential direction, and optical equipment 208, 212, 214, 216, 218, and 220 is fitted into the respective holes 210a.

In the configuration example 2, by driving the rotary actuator 204 to displace the angle of the rotary disk 210 in a rotation direction, the particle counter 1 can switch arrangement of the optical equipment 208, 212, 214, 216, 218, and 220 on the optical path of the light La for use. For example, at the angle illustrated in FIG. 6, the optical equipment 208 is arranged on the optical path, and the intensity of the light La can be adjusted according to functionality and performance of the optical equipment 208. The flow passage of each of the flow cells 10a to 10j is irradiated with the light La passing through the mirror 30 and the lighting lens 40 whose intensity is adjusted.

For example, if the angle of the rotary disk 210 is changed at a pitch of 60 degrees from the angle illustrated in FIG. 6, the particle counter 1 can arrange the other optical equipment 212, 214, 216, 218, and 220 sequentially on the optical path for use. Therefore, the intensity of the light La can be adjusted according to functionality and performance of the optical equipment 212, 214, 216, 218, and 220 arranged on the optical path.

In addition, the rotary disk 210 may be configured by a light-transmitting member (transparent glass plate, transparent acrylic resin plate, or the like). As a result, by displacing the rotary disk 210 to an angle at which a region where the hole 210a is not formed is positioned on the optical path, the particle counter 1 can cause none of the optical equipment 208, 212, 214, 216, 218, and 220 to be arranged on the optical path. In this case, the flow passage of each of the flow cells 10a to 10j is irradiated with the light La passing through the mirror 30 and the lighting lens 40 whose intensity is the intensity with which it is emitted from the light source 20.

According to the upstream power adjustment unit 200, the following effects can be obtained.

(1) Similarly to the downstream power adjustment unit 100, it is possible to realize the adjustment of the intensity of the light La using the optical equipment 208 and the like.

(2) In addition, unlike the downstream power adjustment unit 100 in which it is necessary to prepare filters (filter set) by the separate optical equipment 104 and the like on the optical path to each of the corresponding flow cells 10a to 10j, the particle counter 1 according to the configuration example 1 arranges a single piece of the optical equipment 208 on the optical path at a position immediately before and downstream from the light source 20, and thus the filters (filter set) to be applied to the flow cells 10a to 10j are shared. As a result, it is possible to simplify the configuration by minimizing the number of pieces of the optical equipment 208.

(3) On the other hand, according to configuration example 2, by preparing the optical equipment 208 and the like according to the number of the flow cells 10a to 10j to be applied and by arranging appropriate optical equipment 208 and the like on the optical path according to the selected channel, the particle counter 1 can adjust the intensity of the light La corresponding to the characteristics of the sample fluid and the particles flowing through each of the flow cells 10a to 10j.

Other Configuration Examples

The upstream power adjustment unit 200 may have the following configurations.

In the configuration example 1 in FIGS. 5A and 5B, a plurality of pieces of optical equipment 208 and the like may be arranged in an overlapping manner on the optical path. For example, by preparing a plurality of sets of a plurality of rotary actuators 204, brackets 206, and optical equipment 208 and by arranging the sets such that movable areas do not interfere with each other, the particle counter 1 can arrange one or a plurality of pieces of the optical equipment 208 on the optical path. As a result, it is possible to adjust the intensity of the light La stepwise in accordance with the number of pieces of the optical equipment 208 to be arranged on the optical path.

Similarly, in the configuration example 2 of FIG. 6, the particle counter 1 can prepare a plurality of sets of the rotary actuator 204, the rotary disk 210, the optical equipment 208, and the like and arrange the sets such that the movable areas do not interfere with each other. As a result, it is possible to finely adjust the intensity for each of the flow cells 10a to 10j, and it is possible to further enhance the usefulness.

Figure 7A:
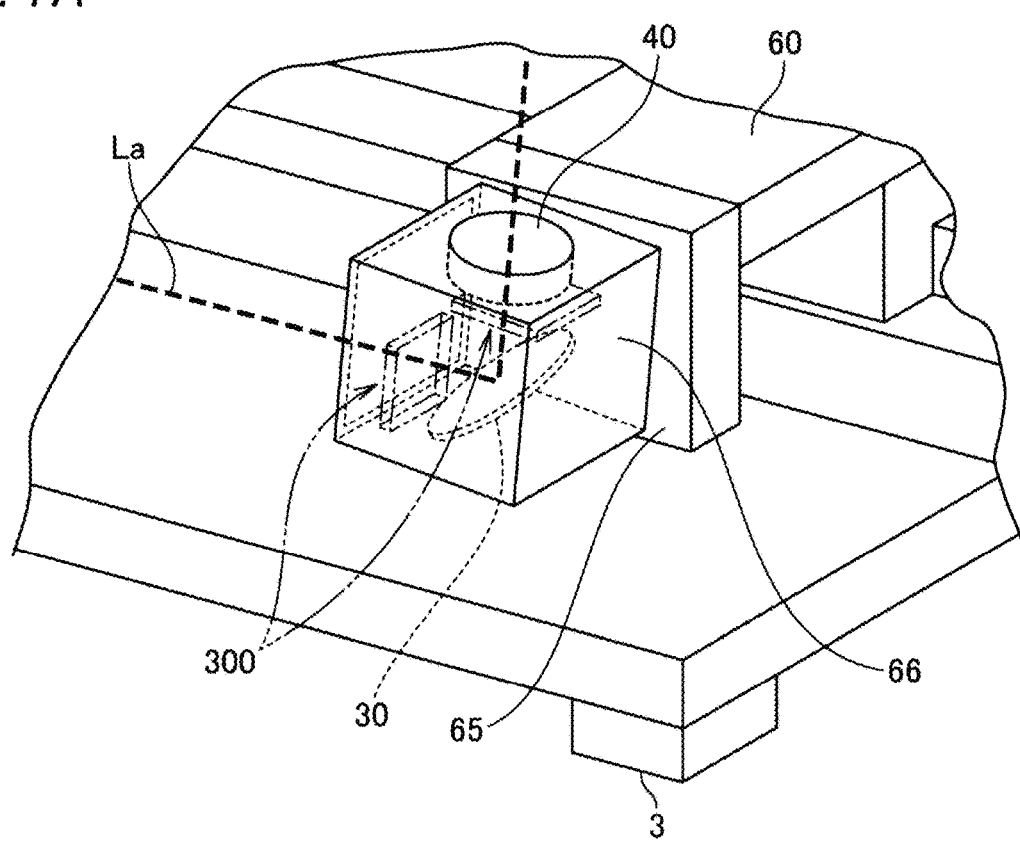
FIG. 7A is a diagram illustrating a configuration example of a midstream power adjustment unit 300.
Figure 7B:
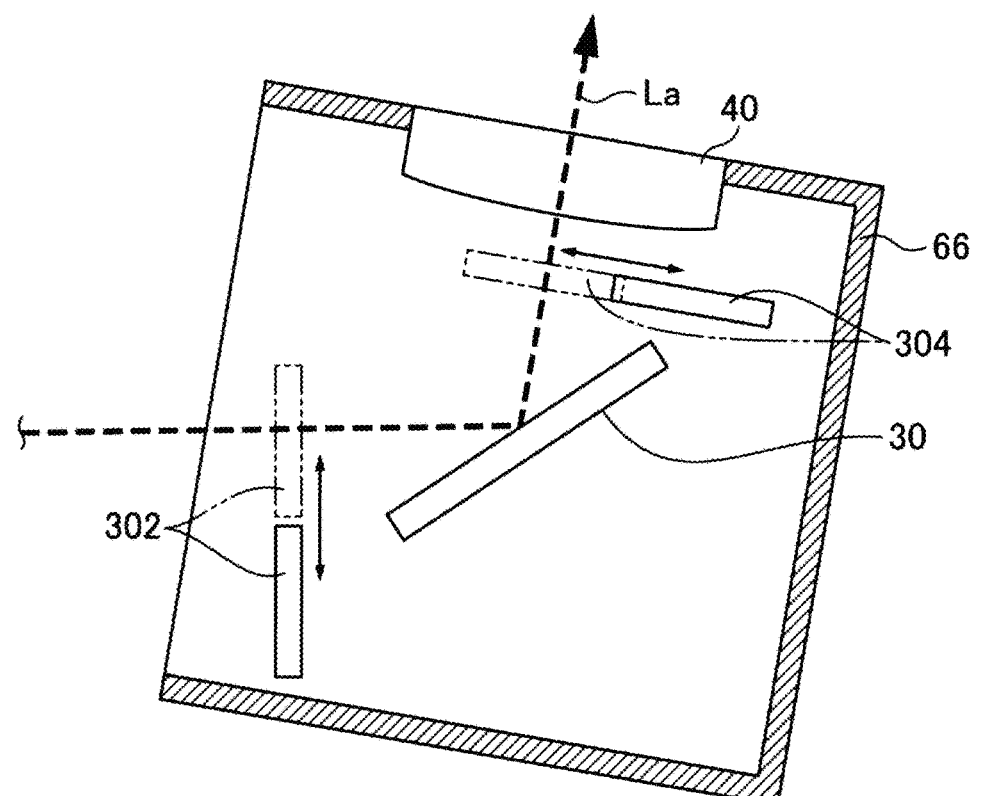
FIG. 7B is a diagram illustrating a configuration example of the midstream power adjustment unit 300.

Also, in the upstream power adjustment unit 200, the sample fluid flowing through the flow cells 10a to 10j of the channel selected as the counting target and other conditions may be detected, and appropriate optical equipment 208 and the like may be automatically selected and arranged based on detection results thereof Midstream Power Adjustment Unit Next, the midstream power adjustment unit 300 will be described. FIGS. 7A and 7B are diagrams illustrating a configuration example of the midstream power adjustment unit 300. FIG. 7A partially illustrates the holder 66 including the mirror 30 and the lighting lens 40 shown in FIG. 1. FIG. 7B illustrates a front view (cross-sectional view in part) of an internal structure of the holder 66.

As for FIG. 7A, as described above, the midstream power adjustment unit 300 may be configured to be divided into two part: one is a unit arranged on the optical path on the incident side of the mirror 30 in the holder 66, and the other is a unit arranged on the optical path on the emission side (between the mirror 30 and the lighting lens 40). The midstream power adjustment unit 300 may use or include only one of them.

As for FIG. 7B, also in the midstream power adjustment unit 300, the intensity of the light La can be adjusted using optical equipment 302 and 304. In this configuration example, one piece of optical equipment 302 is arranged on the optical path on the incident side of the mirror 30, and the other optical equipment 304 is arranged on the optical path on the emission side of the mirror 30. The optical equipment 302 and 304 also may be optical filters, beam splitters, or the like. In addition, by driving a linear actuator, the optical equipment 302 and 304 can be displaced independently between a position (in position indicated by dash-dot-dotted lines in the drawing) in which the light La passes on the optical path and a position (out position indicated by solid lines in the drawing) deviated from the optical path.

According to the midstream power adjustment unit 300, the following effects can be obtained.

(1) Similarly to the downstream power adjustment unit 100, it is possible to realize the adjustment of the intensity of the light La using the optical equipment 302 and 304.

(2) In addition, unlike in the downstream power adjustment unit 100 and upstream power adjustment unit 200, in the midstream power adjustment unit 300, the filters (filter set) of the optical equipment 302 and 304 are arranged in the holder 66 and are arranged to be movable together with the set of the holder 66 including the mirror 30 and the lighting lens 40. Accordingly, it is not necessary to ensure a separate space for arranging the filters (filter set) unlike in the downstream power adjustment unit 100 and the upstream power adjustment unit 200. As a result, the particle counter 1 can reduce the density of components therein, enabling effective heat radiation and easy maintenance.

(3) By displacing the two pieces of the optical equipment 302 and 304 independently, one or both pieces of the optical equipment 302 and 304 can be arranged on the optical path according to the flow cells 10a to 10j to be applied. Therefore, by arranging appropriate optical equipment 302 and 304 on the optical path according to the selected channel, the particle counter 1 can adjust the intensity of the light La according to the characteristics of the sample fluid and the particles flowing through each of the flow cells 10a to 10j.

Other Configuration Examples

The midstream power adjustment unit 300 may have the following configurations.

Only one piece of the optical equipment 302 and 304 may be arranged in the holder 66. In this case, the optical equipment 302 on the incident side may be arranged at a position such that it is movable together with the holder 66 between the light source 20 and the mirror 30. In addition, the optical equipment 304 on the emission side may also be arranged at a position such that it is movable together with the holder 66 between the lighting lens 40 and each of the flow cells 10a to 10j.

Alternatively, even if both piece of the optical equipment 302 and 304 are arranged, the optical equipment 302 on the incident side may be arranged at a position such that it is movable together with the holder 66 between the light source 20 and the mirror 30, and the optical equipment 304 on the emission side may be arranged at a position such that it is movable together with the holder 66 between the lighting lens 40 and each of the flow cells 10a to 10j. In this case, each of the filters (filter set) of the optical equipment 302 and 304 may occupy a substantially equal space in the vicinity of the holder 66, or one of the filters may occupy a larger space than the other.

Also in the midstream power adjustment unit 300, the sample fluid flowing through the flow cells 10a to 10j of the channel selected as the counting target and other conditions may be detected, and appropriate optical equipment 302 and 304 may be automatically selected and arranged based on detection results thereof.

Control Configuration Example

Figure 8:
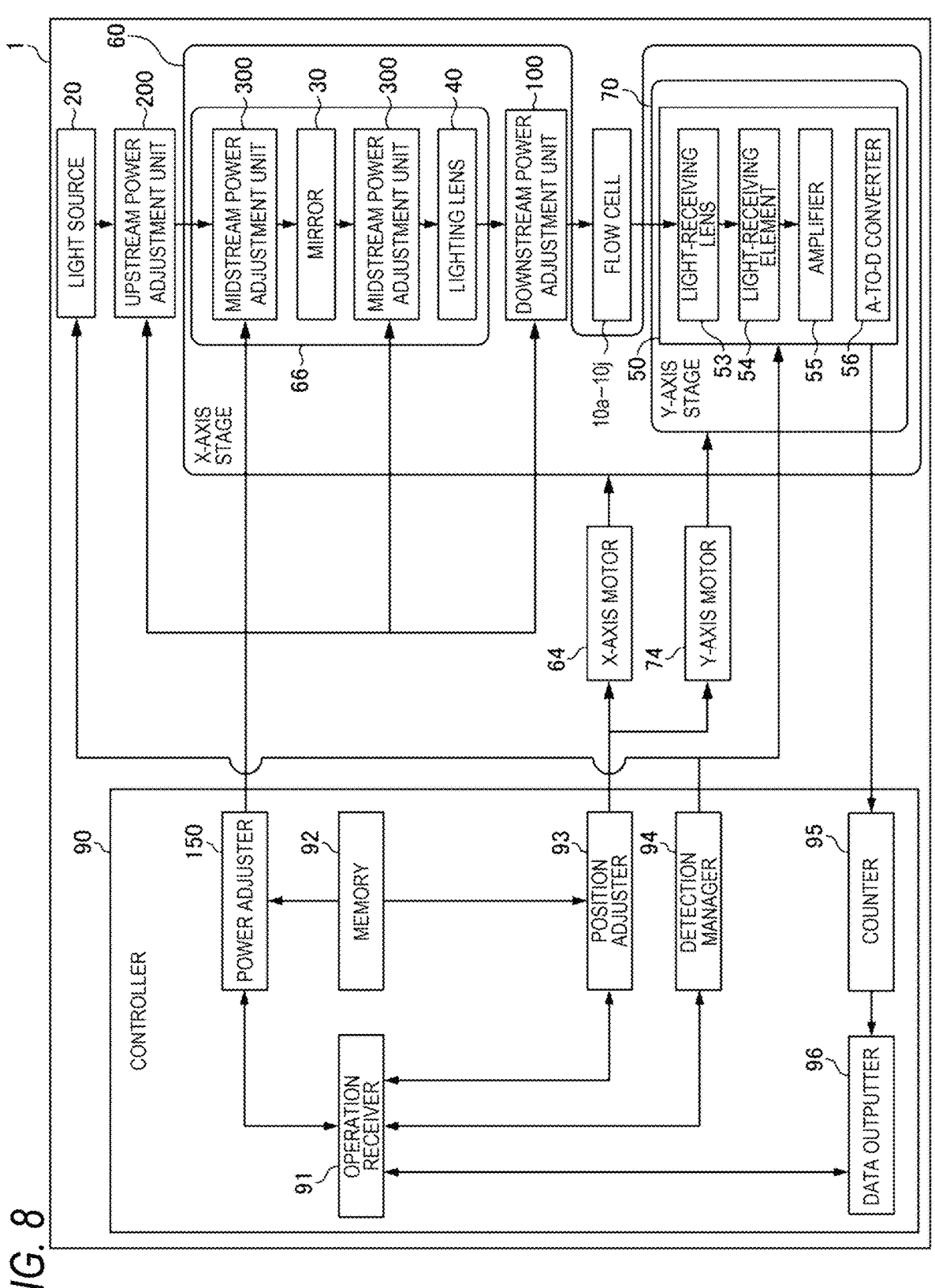
FIG. 8 is a block diagram illustrating a control configuration example of the particle counter 1 according to an embodiment.

FIG. 8 is a block diagram illustrating a control configuration example of the particle counter 1 according to an embodiment. For the sake of convenience, the particle counter 1 here includes the downstream power adjustment unit 100, the upstream power adjustment unit 200, and the midstream power adjustment unit 300, although the particle counter 1 does not have to include all the three units 100, 200, and 300 as long as it includes at least one of them.

The particle counter 1 includes a controller 90 configured to control particle detection and particle counting in addition to the above-described components. The controller 90 includes, for example, an operation receiver 91, a memory 92, a position adjuster 93, a detection manager 94, a counter 95, a data outputter 96, and a power adjuster 150.

The operation receiver 91 is configured to display an operation screen to a user and to receive user's operation onto the operation screen. On the operation screen, the user can instruct the particle counter 1 to, for example, select a channel to be counted, start or end the detection, save counting results, and adjust the intensity of the light La. The operation receiver 91 is configured to give instructions to other functional units 93, 94, 96, and 150 according to the contents of the received operation and to switch the operation screen according to the contents of input from other functional units 93, 94, 96, and 150.

The memory 92 has a storage area where information related to particle detection and particle counting is stored. X-coordinates and Y-coordinates corresponding to the flow cells 10a to 10j of each channel are stored in advance in the memory 92. In addition, appropriate intensity levels of the light La according to the characteristics of sample fluids and particles for each of the flow cells 10a to 10j of each channel are stored in advance in the memory 92. The information stored in the memory 92 may be rewritable as appropriate.

When a specific channel is specified by the operation receiver 91, the position adjuster 93 first loads, from the memory 92, the X-coordinates and the Y-coordinates corresponding to the flow cells 10a to 10j of that channel. Then, the X-axis actuator 62 is operated to drive an X-axis motor 64, thereby sliding the X-axis stage 60 to one of the X-coordinates, and the Y-axis actuator 72 is operated to drive a Y-axis motor 74, thereby sliding the Y-axis stage 70 to one of the Y-coordinates. When driving of the X-axis motor 64 and driving of the Y-axis motor 74 is completed (when position adjustment of the X-axis stage 60 and the Y-axis stage 70 are completed), the detection is ready. The position adjuster 93 notifies the operation receiver 91 that the detection is ready.

Case where Downstream Power Adjustment Unit 100 is not Applied

If the downstream power adjustment unit 100 is not applied to the particle counter 1 but the upstream power adjustment unit 200 and/or the midstream power adjustment unit 300 is applied to the particle counter 1, the power adjuster 150 operates as follows.

In response to a specific channel being specified by the operation receiver 91, the power adjuster 150 loads, from the memory 92, information on the intensity levels of the light La applied to the flow cells 10a to 10j of the channel. Then, drive signals are output to each actuator of the upstream power adjustment unit 200 and/or the midstream power adjustment unit 300. Based on the drive signals, appropriate filters (filter set) are arranged at the in or out positions on the optical path in the upstream power adjustment unit 200 and/or the midstream power adjustment unit 300.

Case where Downstream Power Adjustment Unit 100 is Applied

On the other hand, if the downstream power adjustment unit 100 is applied to the particle counter 1 but the upstream power adjustment unit 200 and the midstream power adjustment unit 300 are not applied to the particle counter 1, the power adjuster 150 enters a standby state. This is because the downstream power adjustment unit 100 uses the optical equipment 104 and the like, which are fixed.

Other Configuration Examples where Downstream Power Adjustment Unit 100 is Applied As for the downstream power adjustment unit 100, the optical equipment 104 and the like may be attached or detached automatically. In this case, when a specific channel is specified by the operation receiver 91, the power adjuster 150 loads, from the memory 92, the information on the intensity levels of the light La applied to the flow cells 10a to 10j of the channel and instructs the downstream power adjustment unit 100 to arrange appropriate optical equipment 104 and the like on the brackets 102 in a position corresponding to each of the flow cells 10a to 10j. Accordingly, as illustrated in FIGS. 2 to 4, appropriate optical equipment 104 (light-transmitting member 120) and the like are arranged on the optical path for each of the flow cells 10a to 10j.

When instructions to start the detection for the specific channel are given by the operation receiver 91, the detection manager 94 causes the light source 20 and the light receiver 50 to operate. In addition, when instructions to end the detection for the specific channel are given by the operation receiver 91, the detection manager 94 causes the light source 20 and the light receiver 50 to stop. When the light source 20 and the light receiver 50 are stopped, the channel to be counted can be changed. The detection manager 94 notifies the operation receiver 91 that the channel can be changed.

The operation states of the light source 20 do not have to be switched each time the detection starts or ends, and the light source 20 may remain in operation while the particle counter 1 is operating. In addition, the detection may be started and/or ended automatically without the use's operation onto the operation receiver 91. For example, the detection may be started automatically after the positions of the stages 60 and 70 have been adjusted by the position adjuster 93 and may be ended automatically after predetermined time has been passed since the start of the detection.

When the light source 20 and the light receiver 50 are caused to be in operation by the detection manager 94, the light La emitted from the light source 20 is reflected by the mirror 30, passes through the lighting lens 40, and enters the flow cells 10*a* to 10*j* in a focused manner, and a detection region is formed at a predetermined position in the flow passage of the sample fluid. When a particle contained in the sample fluid passes through the detection region, light is scattered from the particle, and lateral scattered light is collected by the light-receiving lens 53, enters the light-receiving element 54, and is received by the light-receiving element 54. The lateral scattered light received by the light-receiving element 54 is converted into electrical signals according to the intensity of the light, is amplified by the amplifier 55 with a predetermined gain, and is converted into digital signals by the A-to-D converter 56. Then, the light receiver 50 outputs the digital signals to the counter 95.

The counter 95 is configured to determine the size of the detected particles based on the level of the digital signals output from the light receiver 50, or based on the intensity of the scattered light and to count the particles by size. The counter 95 is configured to output counting results to the data outputter 96.

The data outputter 96 is configured to output data based on the counting results output from the counter 95. The data may be output by showing the data on a display, by outputting the data to a printer, or by transmitting the data to another device through a network. When data of the counting results is generated after the detection, the data can be saved. The data outputter 96 notifies the operation receiver 91 that the final data can be saved.

The controller 90 may be integrally provided inside the particle counter 1 or may be separately provided outside the particle counter 1 with the controller 90 connected to the particle counter 1 by a cable, a network, or the like.

The controller 90 may include an identifier that includes an identification element configured to identify the type of a sample fluid or particles flowing through each of the flow cells 10*a* to 10*j*. In this case, when the instructions to start the detection of a specific channel is given by the operation receiver 91, the identifier identifies the sample fluid or particles flowing through the channel and transmits the detection results to the power adjuster 150. The power adjuster 150 then loads information of an appropriate intensity level from the memory 92 based on the detection results from the identifier and gives instructions to the units 100, 200, and 300 that are applied.

Variable Control of Characteristics

If optical equipment having variable characteristics is used for the downstream power adjustment unit 100, the upstream power adjustment unit 200, or the midstream power adjustment unit 300 that is applied, the power adjuster 150 can appropriately change the characteristics of the optical equipment according to the characteristics of a sample fluid and particles flowing through the flow cells 10*a* to 10*j* of the channel to be counted or according to the intensity level of the light La to be applied. In this case, for example, the downstream power adjustment unit 100 may adjust its optical characteristics by some control without replacing the optical equipment 104 and the like. In addition, the upstream power adjustment unit 200 also may adjust its optical characteristics by adjusting the characteristics of the fixedly arranged optical equipment 208 without rearrangement of the optical equipment 208 and the like. Similarly, the midstream power adjustment unit 300 may adjust its optical characteristics by adjusting the characteristics of the optical equipment 302 and 304 according to the channel to be counted.

Configurations of Particle Counter According to Other Embodiments

Figure 9:
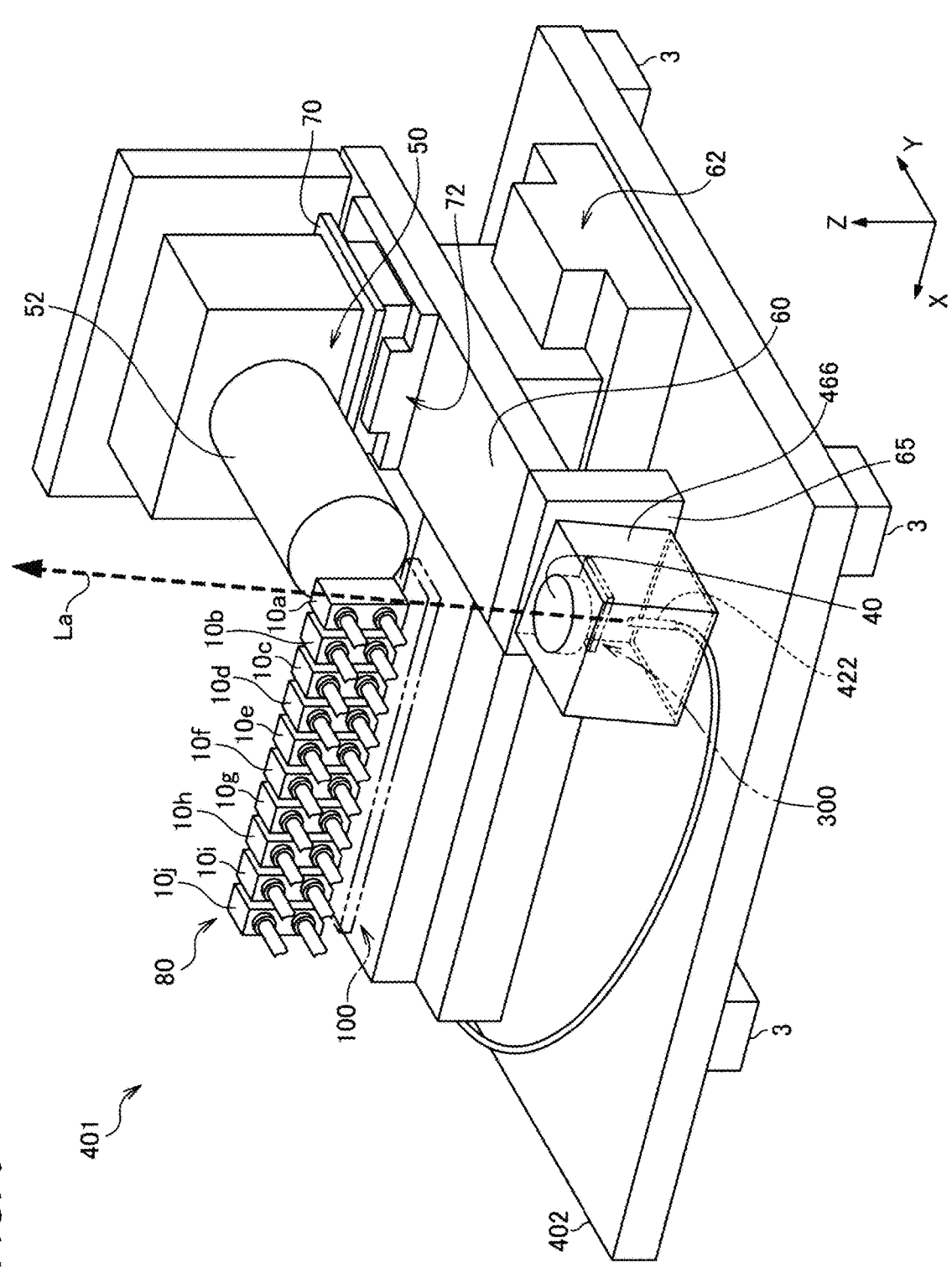
FIG. 9 is a perspective view schematically illustrating a particle counter 401 according to another embodiment.

FIG. 9 is a schematic perspective view of a particle counter 401 according to another embodiment. In FIG. 9, similarly to FIG. 1, some components may be unshown.

In the particle counter 401, a fiber laser is used as the light source of the light La, and the light source in this case is arranged outside the housing. A head 422 is provided at a tip end of an optical fiber extending from the light source. The head 422 is fixed to a holder 466. Therefore, the head 422 is configured to move in the X-direction in tandem with the X-axis stage 60 according to the selected channel. Unlike in the above-described embodiment, no mirror is provided.

Configuration Example Using Trap

Figure 10:
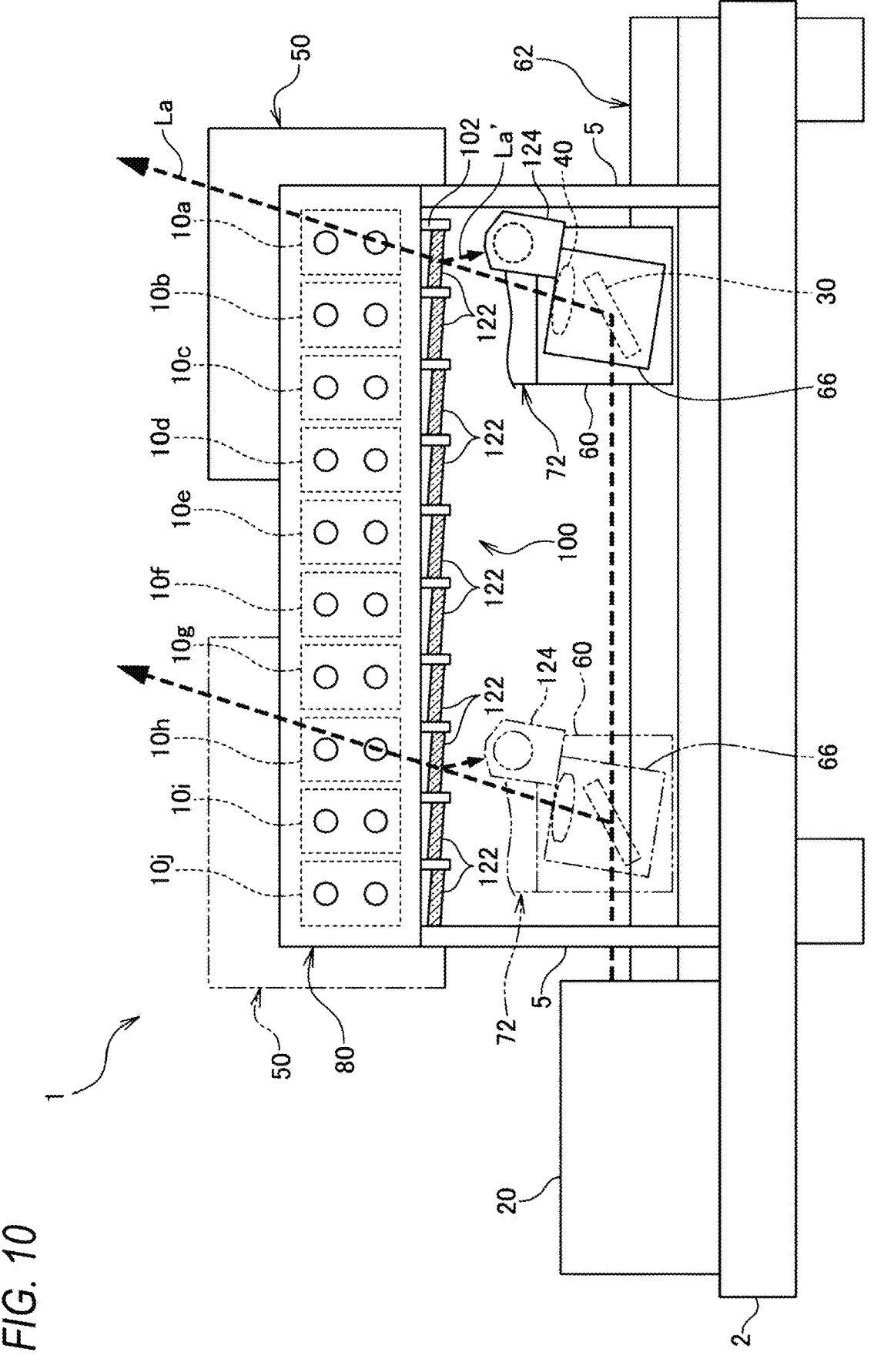
FIG. 10 is a diagram illustrating a configuration example in which a trap device 124 is used in the particle counter 1 according to an embodiment.

FIG. 10 is a diagram illustrating a configuration example in which a trap 124 is used in the particle counter 1 according to an embodiment. In this configuration example, the particle counter 1 includes the trap 124 in addition to the downstream power adjustment unit 100. Although the particle counter 1 according to an embodiment is shown in this example, the trap 124 can also be applied to the particle counter 401 according to another embodiment.

In this configuration example, reflective optical equipment (for example, a beam splitter 122) is used for the downstream power adjustment unit 100. Therefore, the light La is split by the beam splitter 122 into two groups: one is light entering one of the flow cells 10*a* to 10*j*, the other is surplus light La'. Therefore, the light entering the flow cells 10*a* to 10*j* is reduced.

Although each of the flow cells 10*a* to 10*j* is provided with the beam splitter 122 in this example, some of them may be provided with no beam splitter. The optical characteristics of the beam splitters 122 may be different, and an ND filter or the like can be provided instead of a beam splitter 122. The angle at which a beam splitter 122 is arranged can be set as appropriate, and a beam splitter 122 may be arranged horizontally. Further, a beam splitter 122 may be a cube-shaped one instead of a tabular one.

The trap 124 applied in this configuration example is arranged, for example, on the upper surface of the holder 66 at a position where the trap 124 does not interfere with the lighting lens 40. Since the trap 124 is arranged on the upper surface of the holder 66, the trap 124 can move in the X-direction in tandem with the position adjustment of the optical path by the X-axis actuator 62. As indicated by solid lines and dash-dot-dotted lines in FIG. 10, the trap 124 faces the surplus light La' from each of the beam splitters 122. As a result, in the particle counter 1, the number of the trap 124 can be minimized to one, and a plurality of traps 124, each of which corresponds to one of the flow cells 10*a* to 10*j*, is unnecessary.

The trap 124 is configured to confine the surplus light La' split (reflected) by the beam splitters 122, thereby removing harmful effects (for example, noise). The trap 124 may be optical equipment (for example, a beam trap, a beam damper, a beam block, a beam diffuser) configured to terminate light by absorbing it and converting it into heat. The trap 124 does not have to be installed on the upper surface of the holder 66. A plurality of the traps 124 may be provided (for the flow cells 10*a* to 10*j*).

As described above, according to the above-described embodiment, the following advantageous effects can be obtained.

(1) Regardless of which of the downstream power adjustment unit 100, the upstream power adjustment unit 200, and the midstream power adjustment unit 300 is applied, appropriate light conditions suitable for a sample fluid or particles can be achieved for a multi-flow cell particle counter having a common light source. As a result, accurate measurement results can be obtained.

(2) If the downstream power adjustment unit 100 is applied, by arranging the optical equipment 104 and the like on the optical path of each of the flow cells 10a to 10j fixedly in advance, the condition (intensity) of the light La is adjusted to an appropriate condition only by selecting a channel to be counted in the particle counter 1 and by moving the optical path of the light La. As a result, the number of moving elements can be reduced, and durability and maintainability can be enhanced.

(3) If the upstream power adjustment unit 200 and/or the midstream power adjustment unit 300 is applied, since the optical equipment 208 and the like are arranged on the optical path only when the intensity adjustment for the light La is necessary, the entire path of the optical path can be cleared when the intensity adjustment for the light La is unnecessary. In addition, when the intensity adjustment for the light La is unnecessary, since mechanical operation is unnecessary, it is possible to reduce an operating sound or energy consumption.

(4) If the trap 124 is applied, harmful effects caused by the light (the surplus light La' from the beam splitters 122 or the like) reflected by reflective optical equipment can be removed, and the accuracy of the measurement can be improved.

(5) By employing optical equipment having variable characteristics and by changing them by some electrical control, particle counting can be performed under a condition suitable for the channel to be counted without physically replacing or moving the optical equipment.

The present disclosure is not limited to the above-described embodiments, and various modifications can be made.

Although the intensity (power) of the light La is adjusted in the above-described embodiments, other conditions (for example, density distribution, wavelength, polarization) may be adjusted. Further, a variety of optical equipment configured to adjust the condition of the light La may be used instead of optical filters or beam splitters.

Although the particle counter 1 according to the above-described embodiments includes the multi-flow cell 80, the particle counter 1 may include a single-flow cell. In this case, it is not necessary to move the optical system, but the intensity of the light La can be adjusted, by applying the downstream power adjustment unit 100 and/or the upstream power adjustment unit 200, according to the characteristics even if the type of a sample fluid or particles flowing through the flow cell are changed.

In the control configuration example of FIG. 8, a mechanism in which the entire downstream power adjustment unit 100 can be displaced with respect to the multi-flow cell 80 may be applied. In this case, according to which channel is specified, the power adjuster 150 can displace the entire downstream power adjustment unit 100 to arrange the downstream power adjustment unit 100 on the optical path from the lighting lens 40 to the multi-flow cell 80 or can move the downstream power adjustment unit 100 to a position deviated from the optical path.

The trap 124 may be installed as appropriate, in addition to the downstream power adjustment unit 100, in a position where it confines light reflected by reflective optical equip-ment. The trap 124 can also be applied to the upstream power adjustment unit 200 and/or the midstream power adjustment unit 300 as necessary based on the angle with respect to the optical axis and a relation with optical equipment to be used.

Mentioned materials, numerical values, and the like are merely examples and may be modified as appropriate when the present invention is worked.

What is claimed is:

1. A particle counter configured to count particles contained in a sample fluid flowing through a flow passage by using light with which the flow passage is irradiated, the particle counter comprising:

a flow cell having the flow passage;

a flow cell unit encircling the flow cell to confine the flow cell therein; and a light adjuster configured to adjust a condition of the light, wherein the light adjuster is disposed on an outer surface of the flow cell unit, and wherein the light adjuster comprises a plurality of brackets formed on the outer surface of the flow cell unit and protruding outward, the brackets being arranged at regular intervals, and an optical equipment inserted between adjacent brackets.

2. The particle counter according to claim 1, wherein the optical equipment is configured to, when arranged on an optical path of the light, adjust an intensity of the light emitted from a light source, and the optical equipment includes an optical filter and/or a beam splitter.

3. The particle counter according to claim 2, wherein the light adjuster is further configured to move the optical equipment to:

an in position, where the optical equipment is on the optical path; and an out position, where the optical equipment is not on the optical path.

4. A particle counter configured to count particles contained in a sample fluid flowing through a flow passage by using light with which the flow passage is irradiated, the particle counter comprising:

a multi-flow cell having a plurality of the flow passages;

a flow cell unit encircling the multi-flow cell to confine the multi-flow cell therein;

a path adjuster configured to adjust a position of an optical path of the light with respect to the multi-flow cell, based on which flow passage is selected from the flow passages; and a light adjuster configured to adjust a condition of the light with which the selected flow passage is irradiated, wherein the light adjuster is disposed on an outer surface of the flow cell unit, and wherein the light adjuster comprises a plurality of brackets formed on the outer surface of the flow cell unit and protruding outward, the brackets being arranged at regular intervals, and an optical equipment inserted between adjacent brackets.

5. The particle counter according to claim 4, wherein the optical equipment is configured to, when arranged on the optical path, adjust an intensity of the light emitted from a light source, and the optical equipment includes an optical filter and/or a beam splitter.

6. The particle counter according to claim 5, wherein the optical equipment is configured to, if arranged on the optical path, adjust the intensity of the light according to which flow passage is selected from the flow passages.

7. The particle counter according to claim 6, wherein the optical path corresponding to at least one of the flow passages is not provided with the optical equipment.

8. The particle counter according to claim 7, wherein the optical path corresponding to the at least one of the flow passages is provided with a light-transmitting member configured to align the light with a change in an optical axis due to passage of the light through the optical equipment.

9. The particle counter according to claim 5, wherein the light adjuster is further configured to move the optical equipment to:

an in position, where the optical equipment is on the optical path; and an out position, where the optical equipment is not on the optical path.

10. The particle counter according to claim 9, wherein the light adjuster further includes a displacer configured to displace the optical equipment between the in and the out positions.

11. The particle counter according to claim 5, wherein the optical equipment includes a plurality of pieces of optical equipment having different characteristics, and the light adjuster is further configured to cause a piece of the optical equipment to be on the optical path according to which flow passage is selected from the flow passages.

12. The particle counter according to claim 4, further comprising:

a controller configured to control the adjustment of the condition by the light adjuster according to the sample fluid flowing through the flow passage selected from the flow passages.

13. The particle counter according to claim 2, wherein the optical equipment further includes:

a beam splitter configured to split the light into two groups one is light entering the flow passage, and another is surplus light; and a beam trap configured to absorb the surplus light.

14. The particle counter according to claim 5, wherein the optical equipment further includes:

a beam splitter configured to split the light into two groups one is light entering the flow passage selected from the flow passages, and another is surplus light; and a beam trap configured to absorb the surplus light.

15. The particle counter according to claim 2, wherein the optical equipment is made of a substance whose optical characteristic is variable.

16. The particle counter according to claim 5, wherein the optical equipment is made of a substance whose optical characteristic is variable.

17. A particle counter configured to count particles contained in a sample fluid flowing through a flow passage by using light with which the flow passage is irradiated, the particle counter comprising:

a multi-flow cell having a plurality of the flow passages;

a path adjuster configured to adjust a position of an optical path of the light with respect to the multi-flow cell, based on which flow passage is selected from the flow passages;

a light adjuster configured to adjust a condition of the light with which the selected flow passage is irradiated; and a light adjustment unit configured to have the light adjuster which is arranged on the optical path of the light, wherein the light adjustment unit is arranged in a position from a source of the light to the path adjuster and out of a range of motion of the path adjuster, and wherein the light adjuster comprises a rotary disk having a plurality of holes formed at regular intervals in a circumferential direction, and an optical equipment fitted into the respective holes, the rotary disk being rotatable to switch arrangement of the optical equipment on the optical path.

* * * * *